(12) United States Patent
Jepsen et al.

(10) Patent No.: US 7,794,524 B2
(45) Date of Patent: Sep. 14, 2010

(54) METHOD AND APPARATUS FOR REMOVING CONTAMINANTS FROM INDUSTRIAL PROCESSING PLANTS

(75) Inventors: Ove Lars Jepsen, Emmaus, PA (US); Peter T. Paone, III, North Catasauqua, PA (US); John S. Salmento, Nazareth, PA (US)

(73) Assignee: F L Smidth A/S (DK)

( * ) Notice: Subject to any disclaimer, the term of this patent is extended or adjusted under 35 U.S.C. 154(b) by 226 days.

(21) Appl. No.: 12/012,770

(22) Filed: Feb. 5, 2008

(65) Prior Publication Data

US 2009/0193968 A1 Aug. 6, 2009

(51) Int. Cl.
*B01D 53/06* (2006.01)

(52) U.S. Cl. .............. 95/107; 95/90; 95/134; 95/148; 55/423; 110/203; 110/345; 423/210

(58) Field of Classification Search .......... 95/90, 95/107, 134, 148; 55/423; 110/203, 345; 423/210

See application file for complete search history.

(56) References Cited

U.S. PATENT DOCUMENTS

| | | | | |
|---|---|---|---|---|
| 4,708,853 A | * | 11/1987 | Matviya et al. | 423/210 |
| 4,889,698 A | * | 12/1989 | Moller et al. | 423/210 |
| 5,219,544 A | | 6/1993 | Kupper et al. | |
| 5,264,013 A | | 11/1993 | Brentrup | |
| 5,538,537 A | * | 7/1996 | Schmidt et al. | 95/107 |
| 6,103,205 A | * | 8/2000 | Wojtowicz et al. | 423/210 |
| 6,558,454 B1 | * | 5/2003 | Chang et al. | 95/901 |
| 2005/0075236 A1 | * | 4/2005 | Ramme et al. | 502/38 |

FOREIGN PATENT DOCUMENTS

| | | |
|---|---|---|
| DE | 3840858 | 9/1989 |
| EP | 1649922 | 4/2006 |
| JP | 2002355531 | 12/2002 |
| JP | 2006045006 | 2/2006 |
| JP | 2006096615 | 4/2006 |

* cited by examiner

*Primary Examiner*—Robert J Hill, Jr.
*Assistant Examiner*—Christopher P Jones
(74) *Attorney, Agent, or Firm*—Daniel DeJoseph; Aaron M. Pile

(57) ABSTRACT

A method and apparatus for removing purifying vaporizable contaminants such as mercury from a particulate material. Particulate material is first contacted with heated gases to vaporize the contaminants and entrain the material in the gases. The gases are directed to a first dust collector to remove the entrained particulates, after which a sorbent or chemical reagent is injected in the gases to interact with the contaminants and form a contaminant containing product that is entrained in the gases. The product is then separated from the gases in a second collector.

22 Claims, 2 Drawing Sheets

METHOD AND APPARATUS FOR REMOVING CONTAMINANTS FROM INDUSTRIAL PROCESSING PLANTS

BACKGROUND OF THE INVENTION

There is an increasing level of awareness concerning the emission of mercury and other volatile metals such as cadmium and thallium, certain volatile organic compounds (VOCs) and dioxin/furans from industrial plants such as cement manufacturing facilities. Cement plants, for example, have a wide range of mercury inputs and resulting emissions because of the wide variety of raw materials and fuels used in the process.

Consequently, there is an interest in developing cost effective options for controlling these emissions, and that is an object of the present invention.

BRIEF DESCRIPTION OF THE INVENTION

This invention is a method of removing mercury and other contaminants from mineral processing systems such as cement or lime kiln systems or other industrial plants such as power plants.

According to the invention, there is method for the continuous removal of mercury from an industrial plant utilizing a cement or lime kiln that has a mercury laden particulate byproduct such as kiln dust or, in the case of an industrial boiler, fly ash which comprises using existing hot gas streams to vaporize mercury compounds in the particulate. The cleaned particulate can be reused in an industrial process, while the vaporized mercury compounds are removed in a second collector using additional sorbents or chemical reagents if necessary. In one embodiment of the present invention, there is described a method to continuously remove mercury from a industrial plant, in particular a cement plant, that only has to process a fraction of the gas stream going to the plant's main stack to thereby reduce capital and operating costs. By providing a continuous mercury removal, the system reduces the variability of the mercury concentration in the process gas stream so the system does not have to be designed to handle a spike in mercury emissions immediately following a raw mill shutdown. However, this invention is not limited to cement plants or plants with preheater towers. It can be used on any industrial processing plant where recirculation of the volatile metals, VOC's, or dioxin/furans occurs between the dust collector before the stack and the section of the processing plant where the materials are heated, for example long dry cement kilns, long wet cement kilns, lime kilns and a power plant's coal fired boiler.

DESCRIPTION OF THE INVENTION

Figure 1:
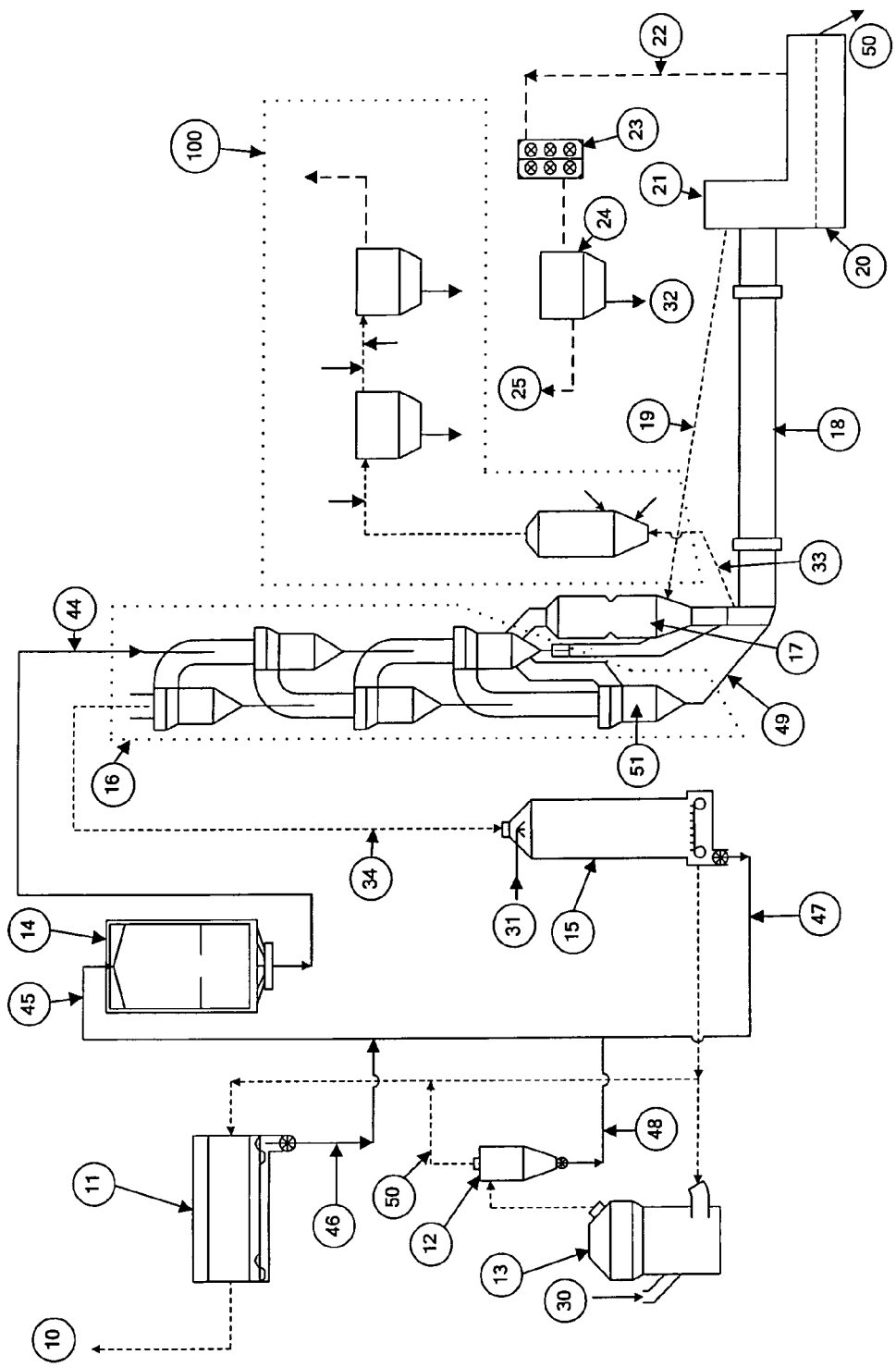
FIG. 1 is a general diagram of a plant for the production of cement clinker adapted to the continuous cleaning of particulate material of mercury and other contaminants.

Although the invention is particularly directed to the removal of mercury it should be understood that the present invention also applies to the removal of other volatile metals, VOC's and dioxin/furans that contaminate manufacturing processes. Also, while emphasis is placed on a cement manufacturing process, it is understand that the invention of the present invention is applicable to other kiln manufacturing processes, such as a lime manufacturing process and other industrial processes such as a power plant.

Mercury typically enters an industrial process, such as a cement kiln process, in raw materials and fuels. In cement processes the mercury enters in very low concentrations. Due to the phase properties of mercury and mercury compounds, very little mercury exits with the cement clinker product. Most of the mercury re-circulates in the process between the raw mill, main kiln filter and the preheater tower. The mercury compounds vaporize in the preheater tower and travel in the gas stream to the raw mill and main kiln filter. When the raw mill is running a high percentage of the mercury in the gas stream is captured by the raw meal. The captured mercury is disproportionably concentrated in the kiln dust in the dust filter after the raw mill. Since very little mercury leaves with the clinker or exits the stack when the raw mill is running, the concentration of mercury increases in the kiln feed, kiln dust, conditioning tower dust, raw mill cyclone dust, downcomer dust, downcomer gas stream, and gas streams in the mid to upper stages of the preheater tower to many times the levels found in the original raw materials. When the raw mill is shut down, the mercury emissions from the main stack increase dramatically as the built up mercury is purged from the system. Removing some or all kiln dust from the kiln system may assist is reducing the mercury emissions in the main stack. However, it may not remove enough mercury, or may not be practical for economic reasons (costs associated with disposing of dust) or environmental reasons (mercury leaching from the kiln dust).

In the present invention mercury containing particulate material is directed through a reaction area, which may simply be a duct or an optional reactor vessel. The source of the particulate material can be the kiln dust removed from the main kiln filter, raw mill cyclone dust, conditioning tower dust, kiln feed, raw material component(s), from a external source such as fly ash from a power plant, or any combination of the these sources. Within the reaction area the mercury containing particulate material is dispersed within a hot gas stream, which may also contain either gaseous mercury or mercury laden dust. The hot gas is provided from a hot gas source such as a kiln gas bypass or other sources such as a stage of the preheater, the downcomer, the calciner, the tertiary air duct, the kiln hood, the cooler vent duct, a mid cooler takeoff, a separate heater, or a any combination of these hot gas sources. The hot gas may be tempered with water or ambient air or cooled with a heat exchanger for a variety of reasons, such as reducing fouling caused by alkali salts or reducing the amount of high temperature materials used in the downstream equipment, but not below the proper temperature for desorption of the mercury and other contaminants from the particulate material, that is, the conversion of mercury and the other contaminants into their gaseous phase, which generally occurs best within the range of from about 300° C. to about 900° C., more preferably 400° C. to about 600° C. and most preferably 450° C. to about 550° C. This heating step is directed to remove the mercury content from the particulate material. The residence time of particulate material in the hot gas needed to remove mercury from the particulate material will depend upon the temperature of the hot gas, the concentration of mercury on the particulate material, and the form of the mercury in the particulate material. Residence time of 0.1 to 3 seconds is generally sufficient for the purposes of this invention. Therefore, when the reaction area is a duct it has to be of sufficient length to provide for sufficient residence time, taking into consideration the velocity of the heated gas through the reaction area.

Chemical additives may be optionally added, either upstream, downstream, or in the reaction area, to assist in converting the mercury to the oxidized form to aid in the readsorption of mercury when the sorbent or chemical reagent is added downstream of the first dust collector. Suitable oxidizing agents include ozone, peroxide, halogenated species such as a chlorine solution, potassium permanganate, hydrochloric acid, iodine and other agents suitable to oxidize mercury.

The preferred amount of oxidizing agent will typically be expressed as its concentration in the gas stream downstream from where the agent is injected. For example, when the oxidizing agent is chlorine the preferred concentration of chlorine in the gas stream will generally range from about 500 to about 10000 ppm. The practitioner of this invention should take into consideration whether there is any naturally occurring oxidizing agents such or other halogens naturally occurring in the hot process gas utilized in the invention, which may be the case depending on the raw materials utilized in the process, the type and form of the oxidizing agent to be used, the amount of volatized mercury in the hot gas and whether any oxidizing agents occur naturally in the hot process gas.

Gases and particulate material exiting the reaction area are maintained at a sufficient temperature to keep mercury in a vaporized form in the gas stream. The gases may be optionally treated with water or ambient air or cooled with a heat exchanger after exiting the reaction area in order to maintain optimal levels of vapor, and the temperature of the gas, into the first dust collector, particularly when the dust collector is a hot ESP. If so treated, the temperature of the gas stream should not fall below the temperature at which the mercury compounds will readsorb back onto the particulate material. When a hot ESP is employed as the first dust collector, the temperature of the gas entering the ESP will generally range from about 350° C. to about 500° C. and preferably from about 450° C. to about 500° C.

Thereafter, clean particulate material is collected in a first, hot dust collector which is a hot ESP, a hot high efficiency cyclone, a high heat ceramic filter or other form of hot dust collector. The collected particulate material will be essentially mercury free so long as the hot dust collector is maintained at a temperature above which mercury is readsorbed. If the collected clean particulate material is predominantly fine cement raw material or an intermediate product found in a cement plant, then it can be returned to the production process as kiln feed after being metered through a bin or silo. Alternatively, the cleaned particulate material can be used it other ways. For example, cleaned fly ash can be used in several industrial processes, such as in the production of cement clinker, as a major component in blended cements, in the manufacture of light weight aggregates, and as a replacement for sand in manufacturing controlled low strength materials.

After the particulate material is collected, the hot gas is optionally cooled downstream of the first dust collector, such as with injections of water or ambient air or a heat exchanger, to a temperature that improves the removal of mercury by the sorbent or chemical reagent. For activated carbon or hydrated lime this temperature is typically below about 200° C. and preferably below about 150° C. However, if a sorbent or chemical reagent is a high temperature sorbent such as Min-Plus™, a trademark of MinPlus Inc. to designate a mineral based, non carbon sorbent, which can adsorb mercury at temperatures above 400° C., then hot gas would not need to be cooled down. The amount of sorbent or chemical reagent added will depend on the amount of mercury in the gas stream, the form of the mercury, the amount of particulate material, which may function as a relatively inefficient sorbent for mercury, remaining in the gas stream, the type of sorbent or chemical reagent employed, and the desired amount of collected mercury. However, assuming an efficient first, hot dust collector ($\geqq$99 percent efficient in removing particulate material) is utilized, resulting in minor amounts of particulate material in the hot gas stream, then activated carbon and hydrated lime are the sorbents of choice, such sorbents will be typically added to the gas stream at the rate of about 1 lbs to about 20 pounds activated carbon per one million cubic feet of process gas. The mercury containing sorbents or chemical reagents and any remaining particulate material are then collected in a second collector, which, when activated carbon or hydrated lime are the sorbents will be a so-called "cold" collector having inlet temperatures typically ranging from about 100° C. to about 200° C., after which the cleaned gases are vented either through a separate stack or one or more other stacks at the cement plant.

Alternatively, the cleaned gases may be vented through a raw material grinding mill, coal mill, main kiln filter, downcomer, or cooler vent system. Some of the collected sorbents or chemical reagents and any remaining particulate material may be re-circulated to the gas stream after it passes through the first dust collector to adsorb more mercury, while any sorbents or chemical reagents and remaining particulate material that is not re-circulated is transported to an appropriate disposal site or regenerated. A gas suspension absorber, which is a form of semi-dry scrubber that utilizes a fluidized bed reactor, can optionally be used after the first dust collector to cool the gas, inject fresh sorbents or chemical reagents, recycled sorbent or chemical reagents and recycled particulate material. An FLSmidth Airtech Gas Suspension Absorber can suitably be used in such an application.

The invention is explained in greater detail below with the aid of the drawings. FIG. 1 shows one embodiment of the application of the method according to the invention using a kiln installation for the production of cement clinker, with the most important elements briefly described. The kiln installation consists in part of a cyclone preheater tower 16, a rotary kiln 18 and a clinker cooler 20. The cyclone preheater 16 comprises four cyclone stages, although less or more cyclone stages can be employed. Raw product from raw mill 13 is directed to the raw mill cyclone 12. The raw mill cyclone separates the finer fraction of raw meal from the coarser fraction. The coarser fraction via conduit 48 can either be directed to reaction area 26 (FIG. 2) as the first step for treatment in contaminant removal area 100 (shown in detail in FIG. 2) to remove contaminants according to this invention or is directed to kiln feed storage/blending silo 14. From silo 14 the feed can either be directed to reaction area 26 as the first step for treatment in contaminant removal area 100 to remove contaminants according to this invention or be introduced into cyclone preheater 16 via kiln feed inlet 44 and preheated in a counter-current arrangement with kiln exhaust gases. The preheated raw meal is separated from cyclone preheater 16 and directed to the calciner 17 in which it is calcined. From the bottom outlet 49 of the separation cyclone 51, the calcined raw meal is then directed to the rotary kiln 18 in which it is burned into cement clinker which is subsequently cooled in clinker cooler 20.

The exhaust gases from rotary kiln 18 and calciner 17 are directed up through the cyclone preheater 16. Tertiary air from the clinker cooler 20 is introduced via duct 19 into calciner 17. Hot gases from preheater tower 16 enter an optional gas conditioning tower (GCT) 15 via downcomer 34.

Gases entering the GCT from may be as hot as 400° C. if the preheater tower has four or five stages. Nozzle means 31 located within GCT 15, near the entrance thereto, injects a spray of cooling liquid into the hot gas flow. Gases exiting GCT 15 can be sent to mill 13 to help dry the ground feed. However, when the raw feed mill 13 is not in operation, gases can flow directly from GCT 15 to main kiln filter 11, which is optionally an electrostatic precipitator. Kiln dust exiting GCT 15 via conduit 47 can either be directed to reaction area 26 as the first step for treatment in contaminant removal area 100 to remove contaminants according to this invention or is directed to silo 14.

Gases and the finer fraction of the raw product from the raw mill exiting cyclone 12 via conduit 50 are directed to main kiln filter 11. Separated dust from main kiln filter 11 via conduit 46 is either collected for treatment according to this invention in reaction area 26 or directed to feed blending/storage silo 14 and the cleaned gas is directed to exhaust.

Figure 2:
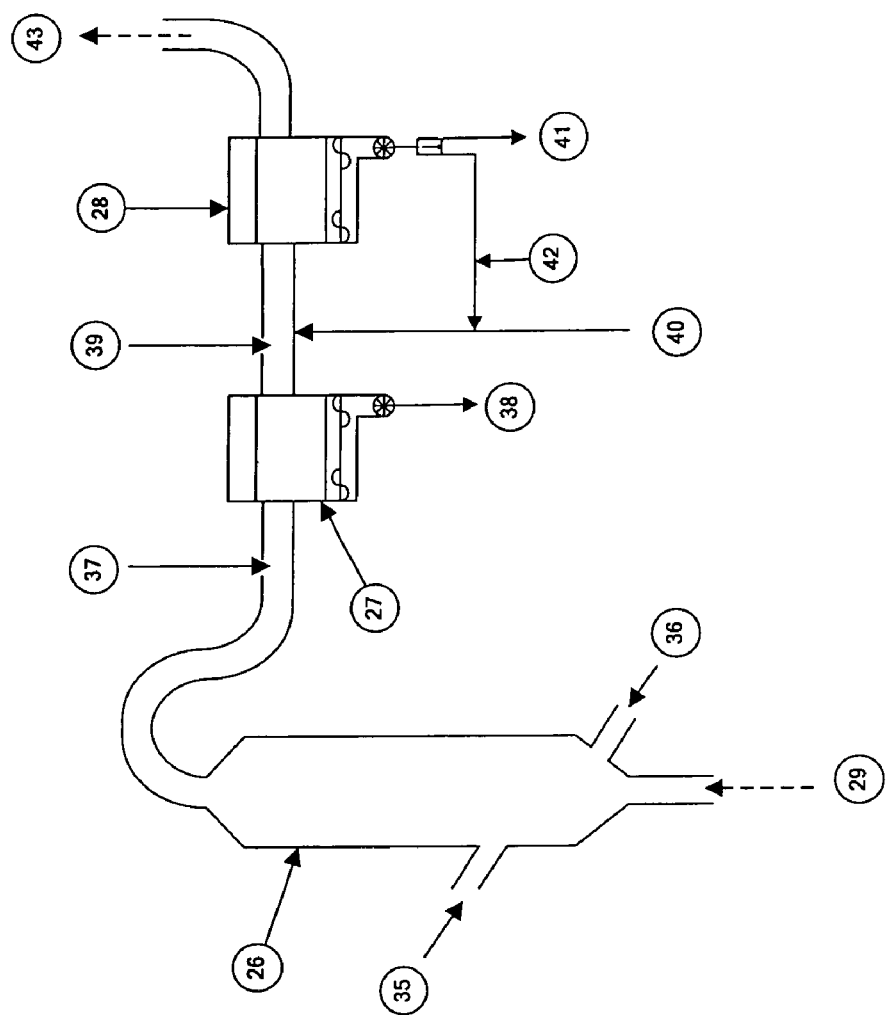
FIG. 2 shows an enlarged partial diagram of the contaminant cleansing zone 100 portion of FIG. 1.

Contaminant removal area 100 is depicted in more detail in FIG. 2. A mercury containing particulate material is fed into material inlet 35 of reaction area 26, which as depicted is a relatively shorter duct or vessel with a larger cross-sectional area than the rest of the ductwork to reduce the gas velocity to achieve the desired residence time. Reaction area 26 can alternatively be a relatively longer duct of the same or smaller cross-sectional area as the rest of the ductwork to achieve the desired residence time. In a cement plant the inlet stream for contaminant removal area 100 is generated from some or all of kiln filter 11, GCT 15, coarser fraction from raw mill cyclone 12, raw material 30, kiln feed 44 or 45, external source such as fly ash from a power plant or a combination of these streams and can be collected and directed to reaction area 26 in any manner known in the art. The mercury containing particulate material is mixed in reaction area 26 with hot gas entering via gas inlet 29. The source of the hot gas for the hot gas inlet 29 can be from a variety of locations in a plant as long as they are within the prescribed temperature ranges described above or contain mercury. These include, but are not limited to, preheater tower 16, calciner 17, tertiary air duct 19, kiln hood 21, cooler vent duct 22, kiln gas bypass duct 33, downcomer 34, or other hot gas sources or combinations of sources. A separate heating system may also be provided for auxiliary heat or for all the heat requirements for the system. Optionally, oxidizing agents can be added to the hot gas reaction area 26 such as via inlet 36 which can be located upstream, downstream, or in reaction area 26. Hot gas containing volatile contaminants and cleaned particulate material is directed to first hot dust collector 38. Optional quenching air or water can be added to the hot gas, such as via inlet 37 or the hot gas can be cooled with a heat exchanger. The cleaned particulate material 38 is returned to the plant to be used as kiln feed-either to the kiln silo 14 or combined with the kiln feed in conduit 44. Alternatively, the cleaned particulate material can be used for other purposes. The hot gas stream containing volatilized contaminants then is directed to the second collector 28. It is a feature of this invention that, prior to entering or in the second collector 28, the contaminants are physically and/or chemically adsorbed onto a sorbent or chemically react with a chemical reagent, with both the sorbent and chemical reagent having been injected into the gas stream. Optionally, the hot gas can be subject to cooling downstream from first dust collector 38, such as through the use of an optional heat exchanger or the addition of quenching air or water, such as via inlet 39, to thereby drop the temperature of the hot gas to a level that increases the amount of mercury removed by the sorbent or chemical reagent. An agent that interacts with the mercury in the gas stream such as sorbents and/or chemical reagents is added to the gas stream via inlet 40 to thereby form a product of the agent/mercury interaction, with the formation of said product concurrently removing mercury from the gas stream. However, if a sorbent or chemical reagent is used that can remove mercury effectively without cooling, such as MinPlus™ sorbent, then the gas may not need to be cooled after the first dust collector. The sorbents or chemical reagents remove essentially any mercury, mercury compound or high molecular weight organic compound that is present in the gas stream. The reactivity and amount of sorbent or chemical reagent used in the present invention can be controlled by the type of sorbent or chemical reagent utilized, where the sorbent or chemical reagent is inserted relative to the second collector and/or the temperature profile (i) of the gas in the area in which the sorbent or chemical reagent is injected and (ii) in the second collector. Generally, the earlier the sorbent or chemical reagent is provided before the second collector, the longer the gas contact time and hence the greater the removal potential. However, the removal of a contaminant may have a temperature window where removal is favored. In the case of mercury and mercury compounds using activated carbon or hydrated lime, adsorption will generally occur in the temperature window of about 20° C. to about 300° C., preferably about 80° C. to about 200° C. Providing the activated carbon or hydrated lime in an area in which the temperature is above this window, even though providing a longer contact time, will not necessarily increase the adsorption efficiency. The sorbent or chemical reagent containing contaminant can be disposed via conduit 41, recycled via conduit 42, or regenerated. Alternatively, some or all of the spent sorbent/chemical reagent can be added to the clinker/cement if the captured mercury is in a form that passes environmental regulations and the clinker/cement passes quality standards. The cleaned gas can be vented via conduit 43 to a separate stack (not shown) or returned to the cement plant.

Using this invention the average amount of mercury emitted from a cement plant is significantly reduced. If the additional mercury reduction is necessary, then the following modifications to the cement plant process can be implemented to further decrease the mercury emissions.

Injecting a sorbent or chemical reagent upstream of the main filter 11, particularly when the raw mill is down. The sorbent or chemical reagent containing mercury would be captured by the main filter 11 and then sent to the contaminant removal area 11.

Redirecting some or all of the gas exiting the main filter 11 in conduit 10, particularly when the raw mill is down, to upstream of location 40 where the sorbent or chemical reagent is added in contaminant removal area 100.

A combination of these two methods.

The invention having been thus described it will be obvious that the same may be varied in many ways without departing from the spirit and scope thereof. All such modifications are intended to be included within the scope of the invention which is defined by the following claims.

We claim:

1. A method of removing vaporizable contaminants from a particulate material, said method comprising (a) in a reaction area, contacting said particulate material with heated gases, said gases being at a temperature at or above the temperature at which said contaminants vaporize to thereby vaporize the contaminants from the particulates and to entrain the particulates in the gases; (b) directing the gases containing the particulate material and the vaporized contaminants to a first dust collector for the particulate material having a temperature at or above the temperature at which said contaminants vaporize, in which first dust collector said particulate material is separated from the gases containing vaporized contaminants, after which said gases containing vaporized contaminants exit said first collector; (c) injecting into the contaminant-containing gases after the gases exit the first dust collector an interactive agent that interacts with the contaminants in the gases that is selected from the group consisting of (i) a sorbent material on which the contaminants are physically and/or chemically adsorbed and (ii) a chemical reagent which chemically reacts with the contaminants to thereby form a product from the agent/contaminant interaction and decrease the amount of contaminant in the gases; (d) directing the gases containing the product to a second collector wherein said product is separated from the gases.

2. The method of claim 1 wherein the interactive agent is a sorbent material.

3. The method of claim 1 further comprising removing additional contaminants from the gases by the addition of an interactive agent to the second collector.

4. The method of claim 1 wherein the second collector has an inlet temperature below the temperature at which said contaminants vaporize.

5. The method of claim 1 wherein the contaminant is mercury.

6. The method of claim 1 further comprising cooling the gases between the reaction area and the first collector while maintaining the contaminants in a vaporized state.

7. The method of claim 1 further comprising cooling the gases between the first collector and the second collector to improve the removal of contaminants by the interactive agent.

8. The method of claim 1 further comprising mixing at least a portion of the separated product with cement or cement clinker.

9. The method of claim 1 wherein the particulate material is kiln dust.

10. The method of claim 1 wherein the particulate material is fly ash.

11. The method of claim 1 wherein the particulate material is raw material utilized in a cement manufacturing process.

12. A method for removing mercury contaminants produced during a cement manufacturing process in a cement plant, in which cement raw meal is comminuted in a raw mill and heat treated in a kiln, with off gases from the kiln directed to a main kiln filter, comprising the steps of: (a) in a reaction area, contacting mercury containing dust generated in the manufacturing of cement with gases that are from a hot gas source from the cement manufacturing process and that are at a temperature at or above the temperature at which said mercury vaporizes to thereby vaporize the mercury from the dust and to entrain the dust in the gases; (b) directing the gases containing the dust and the vaporized mercury to a first dust collector having a temperature at or above the temperature at which mercury vaporizes to thereby separate the dust from the gases and the vaporized mercury, after which said gases and vaporized mercury exit said first dust collector; (c) delivering to the gases after the gases exit the first dust collector an interactive agent that interacts with mercury in the gases, said interactive agent selected from the group consisting of (i) a sorbent material on which mercury is chemically and/or physically adsorbed and (ii) a chemical reagent which chemically reacts with mercury, to thereby form a product from the agent/mercury interaction and decrease the amount of mercury in the gases; (d) directing the gases containing the product to a second collector in which the product is separated from the gas stream.

13. The method of claim 12 further comprising removing additional contaminants from the gases by the addition of an interactive agent to the second collector.

14. The method of claim 12 wherein the source of the mercury containing dust is one or more of kiln dust removed from the main kiln filter, raw mill cyclone dust, conditioning tower dust, kiln feed, or any combination of the these sources.

15. The method of claim 12 wherein the source of the gases utilized in step (a) is one or more of a kiln gas bypass, a stage of a cement preheater, a downcomer, a calciner, a tertiary air duct, a kiln hood, a cooler vent duct, a mid cooler takeoff, a separate heater, or any combination of these sources.

16. The method of claim 12 wherein the dust separated in step (b) is recycled for use in the cement manufacturing process.

17. The method of claim 12 further comprising adding an oxidizing agent to the gases upstream from the second collector to thereby increase the amount of mercury that interacts with the interactive agent.

18. The method of claim 12 further comprising injecting at least a portion of the separated product into the gases upstream of the second collector.

19. The method of claim 12 further comprising, after step (d), recycling at least a portion of the gases to the cement manufacturing process.

20. The method of claim 12 further comprising injecting a sorbent or a chemical reagent upstream of the cement plant's main filter.

21. The method of claim 20 wherein the step of injecting a sorbent or a chemical reagent upstream of the cement plant's main filter is undertaken when the cement plant's raw mill is not operating.

22. The method of claim 12 further comprising redirecting at least a portion of gas exiting the cement plant's main filter to a location upstream of where the interactive agent is delivered to the gases.

* * * * *